Patented Nov. 7, 1939

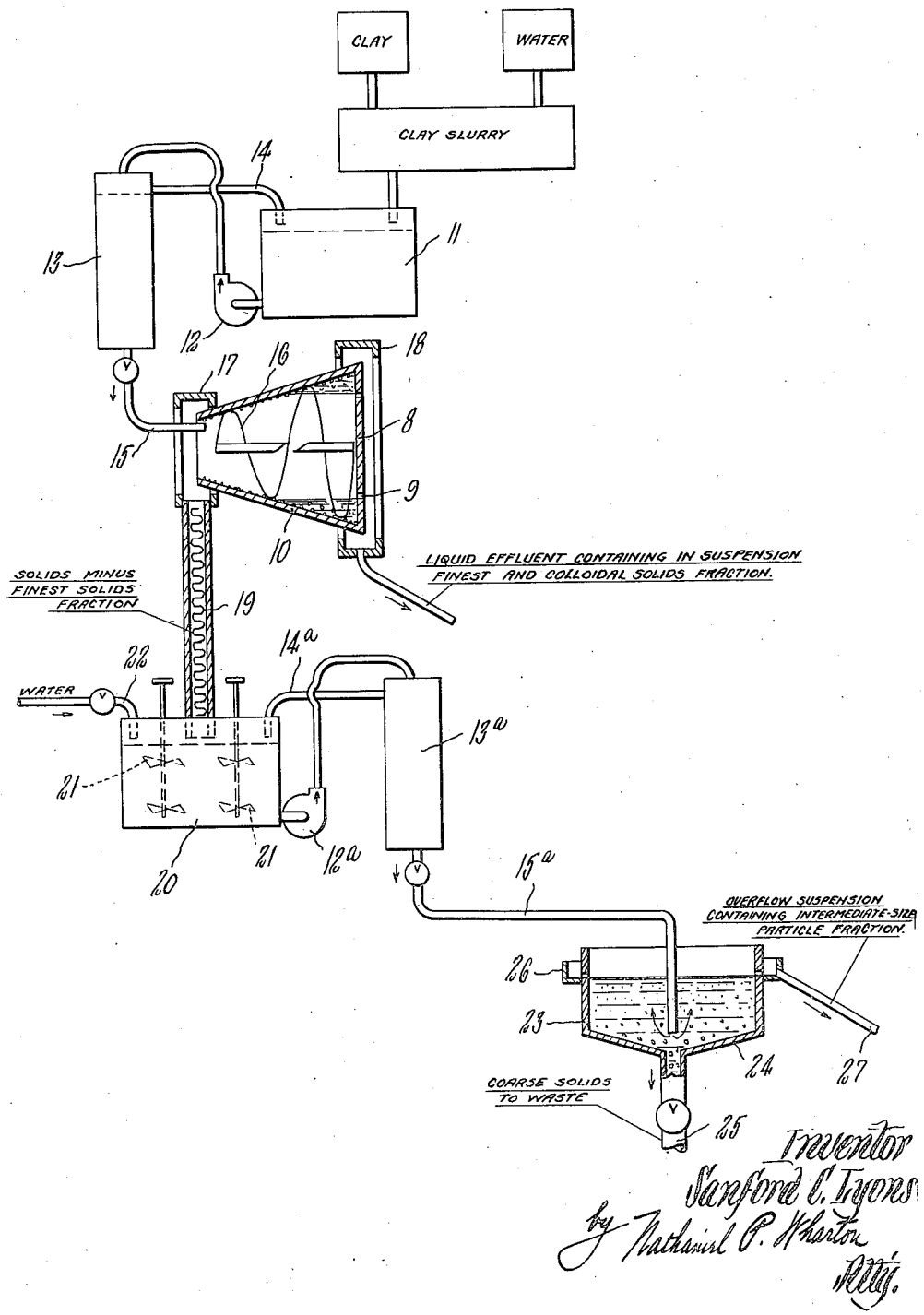

2,179,154

UNITED STATES PATENT OFFICE 2,179,154

FRACTIONATION OR CLASSIFICATION OF FINELY DIVIDED SOLIDS

Sanford C. Lyons, Bennington, Vt., assignor to Bird Machine Co., Walpole, Mass., a corporation of Massachusetts Application February 2, 1938, Serial No. 188,347

9 Claims. (Cl. 209—12)

This invention relates to a process of fractionating or classifying finely divided solid materials of widely varying particle size into at least two fractions each of substantially uniform particle size or particle size range. It deals more especially with the fractionation of such finely divided solid materials containing a substantial fraction of particles of such fine size that they exhibit Brownian movement when suspended in water and can hence be considered as being of colloidal fineness.

In accordance with the present invention, aqueous suspensions of finely divided solid materials of widely varying particle size are subjected to an initial-stage centrifuging treatment under conditions to deposit from suspension all but the very finest or colloidal particle fraction, whereupon the centrifugally deposited fraction is resuspended in water and the resulting aqueous suspension subjected to a second-stage gravitation-settling treatment, preferably in an upflow elutriator or its equivalent, under conditions to settle selectively the coarsest particles while the intermediate-sized particles and residual finest or colloidal particles remain in suspension and are separated from the gravitationally settled coarsest particle fraction. Such a process is economical and advantageous in that each fractionating stage can be made to yield with high rate of output a solids fraction of substantially uniform particle size or particle size range.

In fractionating finely divided solid material, it has sometimes been the practice to suspend the material in water and to employ the differential settling properties of the variously sized particles in producing fractions of different particle size. A preferred specie of fractionation known as elutriation involves progressively feeding a stream of the solids suspension into a tank near its bottom as suspension is progressively overflowing the tank and carrying with it only the relatively fine particles, since the rate of feed of the suspension into the tank can be controlled so that the relatively coarse or heavy particles resist the momentum of the upflowing suspension and gravitate to the bottom of the tank. Fractionation of finely divided solid material by elutriation is, however, usually selective only with relatively low solids content in the suspension; and in the case of finely divided solid material containing a substantial fraction of very fine or colloidal particles, selectivity of fractionation is apt to be poor even with relatively low solids content in the suspension, unless a dispersing or defloccuating agent is added to the suspension for the purpose of peptizing or liberating the intinsically very fine or colloidal particles. Otherwise, the very fine or colloidal particles tend to agglomerat or flocculate and to prevent, on account of so-called thixotropic effect, the differential settling of relatively coarse particles from the upflowing suspension. In respect of the inherent thixotropy of colloidal fines, it might be noted that aqueous slurries or bentonite, which is of extraordinarily small average particle size, exhibit this property to such a degree that slurries of a solids content of as low as 3%, even when they contain dispersing agent, are too viscous to allow the gravity subsidence therefrom of granular particles as course as 75 microns; and aqueous slurries of 40% solids content exhibit a consistency reminiscent of mayonnaise.

The present invention thus utilizes a primary centrifugal-fractionating stage for segregating largely or practically completely the very fine or colloidal fraction from the original finely divided solid material and a secondary gravitational-fractionating or elutriating stage for fractionating or splitting the centrifugally deposited material into an intermediate-sized particle fraction and a coarsest particle fraction. The initial centrifugal-fractionating stage is efficient in segregating selectively the finest particle size fraction from the rest of the starting material even when the suspension of starting material being centrifuged is of high solids content, for the centrifuge is operated under conditions such that the natural differential settling properties of variously sized particles is enormously multiplied. Because the aqueous suspension prepared from the centrifugally deposited solids of the centrifugal-fractionating stage is substantially devoid of very fine or colloidal particles, no trouble is had in realizing selectivity of fractionation in a gravitational-fractionating or elutriating stage even when the aqueous solids suspension is run through such stage at comparatively high solids content and/or in the substantial absence of dispersing agent. It is thus possible to operate the secondary fractionating or elutriating stage of the process hereof with high selectivity and high output, despite the fact that the equipment therefor is distinctly less expensive than that of the centrifuging stage.

While not limited thereto, the two-stage fractionating process is of especial utility as applied to crude clays, which generally contain particles of widely varying sizes, namely, a fraction of very fine or colloidal particle size, a fraction of intermediate-sized particles, and a fraction of coarse particles, including such impurities as sand, mica, etc. Clays quarried in different geographical regions vary in their percentage or content of these fractions. For purpose of illustration, I shall deal herein specifically with the crude clays occurring at Dry Branch, Gordon, McIntyre, and other regions of central Georgia and generally containing about 50% to 60% of clay particles finer than about two microns, about 30% to 20% of intermediate-sized clay particles (i. e., particles ranging from about 2 to 45 microns), and about 20% of coarse particles, including roughly about 10% of oversized impurities of the nature of sand, mica, etc. Such clays may be economically fractionated by the process hereof into a relatively large clay fraction of very fine or colloidal particle size, which fraction is eminently satisfactory for use, for example, in paper-coating compositions, into a substantial clay fraction of intermediate particle size, which fraction is suitable for use, for example, as a filler for certain grades of paper and in the manufacture of ceramic ware, and into a fraction of relatively coarse particle size and containing practically all of the sand, mica, and other oversized impurities, which fraction is usually worthless and may be discarded.

With the foregoing and other features and objects in view, the present invention will now be described in further detail with particular reference to the accompanying drawing, which depicts schematically the more important apparatus for performing the two-stage fractionating process hereof.

Starting with crude clays such as have been indicated, one may proceed to blunge the clay in water to produce a substantially homogeneous aqueous suspension or slip of, say, about 30% solids content. The suspension is preferably passed through a coarse screen which serves to remove therefrom floating trash, lumps of undisintegrated clay, etc., whereupon it is usually desirable to add to the screened suspension a small amount of dispersing or deflocculating agent, such as sodium silicate, sodium phosphate, or the like. The addition of only about 0.2 to 1.0% of dispersing agent, based on the dry weight of the suspended solids, drastically reduces the viscosity of the suspension and conditions it for selective fractionation in a centrifuge at high solids content and with high rate of flow through the centrifuge. The dispersed crude clay suspension having a solids content of about 30% may be delivered into a storage tank 11 for withdrawal and feeding at a substantially uniform rate into a centrifugal fractionator.

As illustrated, the aqueous clay suspension is withdrawn from the tank 11 by a pump 12 and delivered into a receiver 13 at such rate as to ensure therein a constant head or depth of suspension by constant overflow of suspension therefrom through a pipe 14 back to the tank 11. The suspension thus kept at constant head in the tank 13 is fed at substantially uniform rate by way of a valved pipe 15 into a continuous-flow centrifuge 10 near its open small-diameter or intake end. The centrifuge 10, which is preferably of the type disclosed in my Patent No. 2,085,538, dated June 29, 1937, is operated under substantially uniform solids-depositing conditions of such intensity that all of the solids, excepting the clay fraction consisting of the finest or colloidal particles, are deposited from suspension on the wall of the centrifuge. In actual practice, I have used a continuous-flow centrifuge having a small-diameter end of 24″, a large-diameter end of 36″, and a length of 50″ and have rotated such centrifuge at 900 R. P. M. as suspension of about 30% solids content containing about 0.4% sodium silicate, based on the dry weight of the solids, was being fed thereinto at a rate of 65 gallons per minute. Under these conditions, the effluent from the centrifuge was an aqueous suspension containing practically only the very fine or colloidal clay particles. Indeed, more than 90% of the solids suspended in the effluent suspension were of average diameter less than 2 microns and such suspension was practically devoid of particles coarser than six-micron average diameter. The solids fraction deposited on the centrifuge wall consisted essentially of particles coarser than two-micron average diameter and contained only a slight residuum of particles finer than two-micron average diameter.

The centrifugally deposited solids fraction is shown as being progressively removed from the wall of the centrifuge by a helicoidal blade 16 and being discharged from the open small-diameter end of the centrifuge into a trough 17, whereas the aqueous suspending vehicle or effluent containing suspended therein the finest or colloidal clay particles is shown as escaping from the centrifuge into a trough 18 through apertures 9 in the large-diameter end closure 8. The liquid effluent thus discharged from the centrifuge was found, under the particular conditions of operations hereinbefore described, to contain about 45% of the suspended crude clay fed into the centrifuge. Such effluent may be delivered from the trough 18 to any suitable system for the recovery of its fine or colloidal clay fraction. Thus, such liquid effluent may be treated with a suitable clay-flocculating agent, such as alum, and the flocculated clay then recovered in filter presses or the like; or, if desired, the fine or colloidal clay fraction may be recovered from suspension by passing such liquid effluent through an electrophoretic centrifuge of the type described in my Patent No. 2,057,156, dated October 13, 1936, which type of centrifuge is designed especially for the purpose of causing subsidence or removal of extremely fine and colloidal particles from suspension.

The centrifugally deposited solids as emitted under the conditions of operation hereinbefore described, through the open small-diameter end of the centrifuge into the trough 17 were found to be of stiff, pasty consistency and of a moisture content of about 40%. The solids are shown as being progressively withdrawn from the trough 17 through a positive-feed sluice or conduit 19 to a mixing tank 20 equipped with agitators 21 and supplied with water from a valved pipe 22. Such solids may thus be resuspended in water in the tank 20 to produce a substantially uniform slurry or aqueous suspension, which may be fed into an elutriating tank 23 by way of flow-regulating instrumentalities 12a, 13a, 14a, and 15a similar to those in advance of the centrifuge 10. The lower or discharge end of the valved pipe 15a is shown near the tank bottom 24, which is preferably of shallow conical form and contains a central valved outlet pipe 25 through which the sludge or settled fraction of coarse solids may be withdrawn. The tank 23 may be cylindrical and be equipped near its top with an annular overflow gutter 26 leading to a common overflow pipe 27.

As suspension is delivered into the elutriating tank 23 already filled with suspension to the annular overflow gutter 26, the energy or frictional tractive force of viscous flow of the upflowing suspension tends to carry with the suspension the finest particles, whereas the coarsest particles are sufficiently heavy to resist the upflowing currents and to gravitate to the bottom of the tank. The rate of feed of suspension into and up through the elutriating tank 23 is controlled so that the overflow suspension will carry therewith substantially only particles of the desired intermediate size, say, particles finer than about 40 microns, which latter size corresponds to about 325 mesh. The clay fraction of intermediate particle size present in the overflow suspension is useful for such purpose as filler in certain grades of paper products. The overflow suspension may be treated in any suitable way for the recovery of its valuable clay content. Thus, it may be delivered to settling tanks, wherein the clay particles may be allowed to settle or concentrate to form a sludge of, say, about 25% to 35% solids content, which sludge may be delivered to filter presses serving to remove practically completely the solids and to yield cakes of about 60 to 75% solids content. The cakes may be dried and shipped as such or they may be pulverized as in hammermills, preparatory to shipment. The supernatent water in the settling tanks may be decanted and reused for suspending fresh centrifugally deposited solids being fed from the centrifuge 10 to the mixing tank 20. The sediment or coarse particle fraction settling on the bottom of the tank 24 may be removed progressively or intermittently through the valved discharge pipe 25 and discarded.

The suspension being fed progressively into the elutriating tank 23 may have a solids content upwards of about 10% and be practically devoid of dispersing agent, that is, contain no dispersing agent other than the minute residue of dispersing agent used in preparing the original dispersion of the crude or whole clay. In the case of ordinary crude clay containing a large or substantially fraction of colloidal or very fine particles, when a suspension of about 10% solids content is formed from the whole clay in the substantial absence of dispersing agent, the resulting suspension is so viscous, on account of flocculation of colloidal particles or thixotropic effect, that particles of a diameter in the order of magnitude of 40 microns will not settle out differentially to the desired degree in an upflow elutriator at practical rates of flow through the elutriator. Indeed, in such latter case, particles as coarse as, say, about 75 microns (200 mesh) are apt to remain suspended and enmeshed in the flocculated or aggregated colloidal particles. In the case of the resuspended centrifugally deposited clay fraction delivered to the upflow elutriator accordant with the process hereof, on the other hand, the relative absence from the suspension of very fine and/or colloidal particles, that is, particles finer than about 2 microns, makes for a relatively fluent or low-viscosity suspension and, accordingly, makes possible a selective gravitational settling from the suspension of coarse particles even in the substantial absence of dispersing agent and with substantial solids content in the suspension and commercially satisfactory rates of flow of suspension through the upflow elutriator. In actual practice, it has been found possible by selective gravitational settling or elutriation accordant with the present invention to recover from the suspension of centrifugally deposited solids upwards of about 50% of such solids in the form of a clay product composed practically completely of particles of less than about 45-micron average diameter and containing but a very small percentage of, or practically no, particles finer than about 2-micron average diameter.

The rate of feed or upflow of the centrifugally deposited solids suspension through the elutriator may vary considerably, for instance, between limits of about four feet per hour to about twelve feet per hour, depending upon such factors as the largest size particles permissible in the overflow suspension, the solids content of the suspension entering the elutriator, the temperature of the suspension, the depth of suspension in the elutriator, the shape of the suspended particles, etc. The temperature of the suspending water is mentioned as being an important factor, since, in the case of finely divided particles, even a small change in viscosity of the water brought about by change in the water temperature is attended by appreciable change in the rate of subsidence of the particles. Again, shape of the suspended particles is an important factor for the reason that particles of scaly or flaky character are more resistant to settling than particles of round or jagged character. In other words, the position of equilibrium for a subsiding particle is normal or penpendicular to its plane of greatest area; and scaly or flaky particles tend to assume a position affording maximum resistance to subsidence through the suspending medium. While the presence or absence of dispersing agent in the suspension of centrifugally deposited fraction affects differential settling of its variously sized particles, such effect is not anywhere nearly as pronounced as in crude or whole clay suspension laden with the colloidal or very fine size clay particles. It is thus understandable why the desired selectivity of fractionation of the centrifugally deposited solids can be realized in the substantial absence of dispersing agent in the aqueous suspension of such solids. It might be noted that the particular conditions under which the gravitational-settling or elutriating stages of the process hereof is to be performed, including the particular rate of flow through such stage, can be empirically determined to yield overflow suspension containing substantially only the intermediate-sized particles, for instance, particles of about 2 to 40 microns.

While it is possible to dispense with the use of dispersing agent in the initial or centrifugating stage of the process hereof, yet it is usually desirable to add a small percentage of dispersing agent to the crude clay suspension so that such suspension may be fractionated selectively at the desired high solids content in the centrifugating stage and with the desired high rate of suspension flow through this stage. However, an important advantage of the process hereof is that it is possible to dispense entirely with the use of dispersing agent in fractionating by gravity or elutriation the centrifugally deposited fraction and at the same time operate such gravity-fractionating or elutriating stage selectively and economically. In this connection, it must be borne in mind that a clay product of intermediate particle size, say, of about 2 to 40 microns, is salable at a relatively low figure, which is currently about six dollars per ton; and the saving in the dispersing agent and the flocculating agent also generally used in recovering a predispersed clay may be as high as fifty to sixty cents per ton of clay. Moreover, clay-producing plants are frequently faced with the problem of being supplied with sufficient clean water for clay-processing. This is particularly true of the clay regions in central Georgia, which are practically lacking in streams of clear water and whose rivers and brooks contain so much reddish or iron-oxide-contaminated clay and organic matter that it is necessary to go to the trouble and expense of sinking wells and pumping well water in tremendous volume to the clay-producing plants. Because the volume of water used per ton of clay being processed is very large, it is customary practice to reuse the water as many times as possible. However, when dispersing and flocculating agents are added to the clay-processing water, reuse of the water cannot continue very long, since the water becomes contaminated by the water-soluble dispersing and flocculating agents and their reaction products to such an extent that they are apt to retard or inhibit the effect of newly-added agents and also to contaminate unduly the finished clay product. The fact is that when dispersing and/or flocculating agents, which are generally water-soluble electrolytes, are added to the clay-processing water and the water is reused excessively, the concentration of water-soluble electrolytes in the water may become so great as to develop in the finished or dried clay cakes a crusty deposit that renders difficult resuspension of the clay in water to the desired fine particle size at its destination or place of use. Undue contamination of the finished clay product with water-soluble electrolytes or salts is apt also to interfere with satisfactory use of the clay in a paper mill, as by adversely affecting such properties as retention of the clay by papermaking stock or by detracting from the desired printing and other properties in papers coated with compositions containing the clay. Since at least the gravitational-fractionating or elutriating stage of the process hereof dispenses with the need of using dispersing and/or flocculating agent in the water of suspension passing through such stage, the process hereof enables prolonged or indefinite reuse of such water in suspending the centrifugally deposited solids progressively emitted by the primary fractionating stage and at the same time yields an intermediate-sized clay fraction of the desired substantially complete freedom from water-soluble electrolytes or salts.

The two-stage fractionating process hereof may be applied advantageously to many finely divided solid materials other than crude clay and also to a solid fraction produced by other fractionating processes, especially when such fraction contains besides a main coarse particle component a material amount or residuum of intermediate-sized particles and/or very fine or colloidal particles and it is desired to separate or recover such latter particles from the main coarse particle component. For instance, calcined inorganic pigments, such as lithopone and titanium oxide, are usually ball-milled in water to form an aqueous slurry containing particles varying from colloidal particle size to palpable grit. Such ball-milled calcined pigment slurries may be subjected to the initial centrifugal-fractionating stage of the process hereof to produce a pigment fraction consisting practically entirely of the very finest or colloidal particles, say, particles finer than about two-micron average diameter, which fraction is eminently suitable for use in enamels and finishing paints of high opacity and light-reflecting properties. The centrifugally deposited pigment fraction may be resuspended in water and subjected to the gravitational-fractionating or elutriating stage of the process hereof to produce an intermediate-sized particle fraction, say, one consisting practically entirely of pigment particles ranging from about two to about forty microns, which fraction is eminently suitable for use in so-called flat or base paints. The processing of such pigments and the recovery of the pigment fractions from suspension may be carried out much in the same way as hereinbefore described in connection with clay. As in the case of clay, it is desirable that the recovered pigment fractions be practically free from water-soluble salts or electrolytes; and no dispersing agent need be used in either the primary or secondary fractionating stage or at least in the secondary fractionating stage. The grit or coarsest pigment fraction represents valuable material and may be returned to the ball mill for remilling in the presence of water along with freshly calcined pigment. The two-stage fractionating process hereof may also be applied to such finely divided pigments, fillers, or other materials of widely varying particle size as zinc sulphide, zinc oxide, barium sulphate, calcium carbonate, etc., which materials may result from precipitation, fuming, sintering or calcination, or grinding naturally occurring mineral or rock, such as calcium carbonate, or artificial mineral or rock, such as carborundum or other abrasive.

I claim:

1. A process of fractionating finely divided solid material of widely varying particle size, including a fraction of such fine particle size as tends to interfere materially with selective gravitational settling of coarser particles from an aqueous suspension of such material, which comprises centrifuging an aqueous suspension of such material to deposit centrifugally substantially all but the very finest particle fraction, resuspending the centrifugally deposited fraction in water, and gravitationally settling from the resulting suspension the coarsest particle fraction while maintaining above and removing from the gravitationally settled fraction an aqueous suspension of the intermediate-size particle fraction.

2. A process of fractionating finely divided solid material of widely varying particle size and including a fraction of relatively very fine or colloidal particle size tending to interfere materially with selective gravitational settling of coarser particles from an aqueous suspension of such material, a fraction of intermediate particle size, and a fraction of relatively coarse particle size, which comprises centrifuging an aqueous suspension of such material under conditions to deposit centrifugally substantially all but the very fine or colloidal particle fraction, resuspending the centrifugally deposited fraction in water, and passing the resulting suspension through an upflow elutriator under conditions of upflow to settle gravitationally in the elutriator the coarsest particle fraction and thereby leave in the effluent suspension from the elutriator substantially only the intermediate-size particle fraction.

3. A process of fractionating finely divided solid material of widely varying particle size and including a fraction of relatively very fine or colloidal particle size tending to interfere materially with selective gravitational settling of coarser particles from an aqueous suspension of such material, a fraction of intermediate particle size, and a fraction of relatively coarse particle size, which comprises centrifuging an aqueous suspension of such material in the presence of a dispersing agent for the very fine or colloidal particles and under conditons to deposit centrifugally therefrom substantially all but the very fine or colloidal particle fraction, resuspending the centrifugally deposited fraction in water practically free from dispersing agent, and passing the resulting suspension through an upflow elutriator under conditions of upflow to settle gravitationally in the elutriator the coarsest particle fraction and thereby leave in the effluent suspension from the elutriator substantially only the intermediate-size particle fraction.

4. A process of fractionating substantially whole clay, which comprises centrifuging an aqueuos suspension of such clay to deposit centrifugally substantially all but the very fine or colloidal particle fraction tending to interfere materially with selective gravitational settling of coarser particles from said aqueous suspension, resuspending the centrifugally deposited fraction in water, and gravitationally settling from the resulting suspension of coarsest particle fraction, including the oversized impurities, while maintaining above and removing from the gravitationally settled fraction and aqueous suspension of the intermediate-size particle fraction.

5. A process of fractionating substantially whole clay, which comprises centrifuging an aqueous suspension of such clay under conditions to deposit centrifugally substantially all but the very fine or colloidal particle fraction tending to interfere materially with selective gravitational settling of coarser particles from said aqueous suspension, resuspending the centrifugally deposited fraction in water, and passing the resulting suspension through an upflow elutriator under conditions of upflow to settle gravitationally in the elutriator the coarsest particle fraction, including oversized impurities, and thereby leave in the effluent suspension from the elutriator substantially only the intermediate-size particle fraction.

6. A process of fractionating substantially whole clay, which comprises centrifuging an aqueous suspension of such clay in the presence of a dispersing agent for the very fine or colloidal particles and under conditions to deposit centrifugally substantially all but the very fine or colloidal particle fraction tending to interfere materially with selective gravitational settling of coarser particles from said aqueous suspension resuspending the centrifugally deposited fraction in water practically free from dispersing agent, and passing the resulting suspension through an upflow elutriator under conditions of upflow to settle gravitationally in the elutriator the coarsest particle fraction, including oversized impurities, and thereby leave in the effluent suspension from the elutriator substantially only the intermediate-size particle fraction.

7. A process of fractionating an aqueous calcined pigment suspension containing particles of widely varying particle size and including a fraction of relatively very fine or colloidal particle size tending to interfere materially with selective gravitational settling of coarser particles from said suspension, a fraction of intermediate particle size, and a fraction of relatively coarse particle size, which comprises centrifuging said suspension to deposit centrifugally substantially all but the very fine or colloidal particle fraction, resuspending the centrifugally deposited fraction in water, and gravitationally settling and removing from the resulting suspension the coarsest particle fraction while maintaining above and removing from the gravitationally settled fraction an aqueous suspension of the intermediate-size particle fraction.

8. A process of fractionating an aqueous calcined pigment suspension containing particles of widely varying particle size and including a fraction of relatively very fine or colloidal particle size tending to interfere materially with selective gravitational settling of coarser particles from said suspension, a fraction of intermediate particle size, and a fraction of relatively coarse particle size, which comprises centrifuging said suspension to deposit centrifugally substantially all but the very fine or colloidal particle fraction, resuspending the centrifugally deposited fraction in water, and passing the resulting suspension through an upflow elutriator under conditions of upflow to settle gravitationally in the elutriator the coarsest particle fraction and thereby leave in the effluent suspension from the elutriator substantially only the intermediate-size particle fraction.

9. A process of fractionating an aqueous calcined pigment suspension containing particles of widely varying particle size and including a fraction of relatively very fine or colloidal particle size tending to interfere materially with selective gravitational settling of coarser particles from said suspension, a fraction of intermediate particle size, and a fraction of relatively coarse particle size, which comprises centrifuging said suspension in the presence of a dispersing agent for the very finest or colloidal particle fraction and under conditions to deposit centrifugally substantially all but the very fine or colloidal particle fraction, resuspending the centrifugally deposited fraction in water pratically free from dispersing agent, and passing the resulting suspension through an upflow elutriator under conditions of upflow to settle gravitationally in the elutriator the coarsest particle fraction and thereby leave in the effluent suspension from the elutriator substantially only the intermediate-size particle fraction.

SANFORD C. LYONS.